United States Patent
Ram et al.

(10) Patent No.: US 10,805,892 B2
(45) Date of Patent: Oct. 13, 2020

(54) DISTRIBUTED MIMO BASED ON ACCESS POINT COLLABORATION

(71) Applicant: NXP USA, Inc., Austin, TX (US)

(72) Inventors: B Hari Ram, Chennai (IN); Sri Varsha Rottela, Visakhapatnam (IN); Vijay Ahirwar, Pune (IN); Sudhir Srinivasa, Los Gatos, CA (US); Nilesh N Khude, Pune (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/510,992

(22) Filed: Jul. 15, 2019

(65) Prior Publication Data

US 2019/0373569 A1    Dec. 5, 2019

Related U.S. Application Data

(62) Division of application No. 16/424,532, filed on May 29, 2019.
(Continued)

(51) Int. Cl.
*H04W 56/00* (2009.01)
*H04B 7/0413* (2017.01)
(Continued)

(52) U.S. Cl.
CPC ........ *H04W 56/001* (2013.01); *H04B 7/0413* (2013.01); *H04B 7/0417* (2013.01);
(Continued)

(58) Field of Classification Search
CPC . H04W 56/001; H04W 56/005; H04W 84/12; H04W 84/042; H04W 16/28;
(Continued)

(56) References Cited

U.S. PATENT DOCUMENTS

| | | | |
|---|---|---|---|
| 7,893,871 B1 * | 2/2011 | Lee | H01Q 1/246 342/377 |
| 8,457,236 B2 | 6/2013 | Gomadam et al. | |

(Continued)

FOREIGN PATENT DOCUMENTS

| | | | | |
|---|---|---|---|---|
| EP | 3525511 A1 * | 8/2019 | | H04B 7/024 |
| WO | WO-2014066785 A1 * | 5/2014 | | H04B 7/0491 |

(Continued)

OTHER PUBLICATIONS

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages (Year: 1999).*

(Continued)

*Primary Examiner* — Afsar M Qureshi (57) ABSTRACT

A method for communication includes respectively associating each of a plurality of client stations (STAs) with at least one basic service set (BSS) of at least one access point (AP) in a WLAN. The APs in the WLAN are synchronized prior to transmitting data to the STAs. First and second groups of the antennas are defined for downlink communication with the first and second STAs, each of the groups including antennas belonging to at least two of the APs. Different, first and second distributed beamforming parameters are computed over the first and second groups of the antennas. Respective data for transmission to the first and second STAs are distributed to the APs to which the antennas in the respective first and second groups belong and are transmitted in synchronization in accordance with the first and second distributed beamforming parameters.

15 Claims, 8 Drawing Sheets

Related U.S. Application Data (60) Provisional application No. 62/677,949, filed on May 30, 2018, provisional application No. 62/694,800, filed on Jul. 6, 2018, provisional application No. 62/730,407, filed on Sep. 12, 2018, provisional application No. 62/774,782, filed on Dec. 3, 2018, provisional application No. 62/783,144, filed on Dec. 20, 2018.

(51) Int. Cl.
    *H04B 7/06*     (2006.01)
    *H04W 16/28*     (2009.01)
    *H04W 76/11*     (2018.01)
    *H04B 7/0417*     (2017.01)
    *H04W 84/04*     (2009.01)
    *H04W 84/12*     (2009.01)

(52) U.S. Cl.
    CPC .......... *H04B 7/0617* (2013.01); *H04W 16/28* (2013.01); *H04W 56/005* (2013.01); *H04W 76/11* (2018.02); *H04W 84/042* (2013.01); *H04W 84/12* (2013.01)

(58) Field of Classification Search
    CPC ... H04W 76/11; H04B 7/0413; H04B 7/0417; H04B 7/0617
    See application file for complete search history.

(56) References Cited

U.S. PATENT DOCUMENTS

| | | | |
|---|---|---|---|
| 8,543,063 B2 | 9/2013 | Bergel et al. | |
| 9,124,327 B2 | 9/2015 | Gomadam et al. | |
| 9,306,645 B2 | 4/2016 | Zhang | |
| 9,307,523 B2 | 4/2016 | Gomadam | |
| 9,743,273 B2 * | 8/2017 | Gong | H04W 74/006 |
| 10,051,588 B2 * | 8/2018 | Wang | H04W 56/001 |
| 10,348,394 B1 * | 7/2019 | Bakr | H04L 12/2854 |
| 2008/0003948 A1 * | 1/2008 | Mitran | H04B 7/024 455/67.11 |
| 2008/0212461 A1 * | 9/2008 | Pande | H04L 5/0023 370/203 |
| 2014/0362840 A1 | 12/2014 | Wong et al. | |
| 2015/0295629 A1 * | 10/2015 | Xia | H04B 7/0695 370/329 |
| 2020/0059808 A1 * | 2/2020 | Lim | H04B 7/0626 |

FOREIGN PATENT DOCUMENTS

| | | | |
|---|---|---|---|
| WO | 2018093132 A1 | 5/2018 | |
| WO | WO-2018093132 A1 * | 5/2018 | ............ H04W 72/04 |

OTHER PUBLICATIONS

Zhang et al., "Exploiting Multi-Antennas for Opportunistic Spectrum Sharing in Cognitive Radio Networks", IEEE the 18th Annual IEEE International Symposium on Personal, Indoor and Mobile Radio Communications (PIMRC), 2007, 5 pages. (Year: 2007).*

PCT International Application No. PCT/KR2014/006003, Written Opinion of the International Searching Authority dated Oct. 15, 2014, 19 pages (Year: 2014).*

IEEE Std 802.11™-2016 specification , IEEE Standard for Information technology—Telecommunications and information exchange between systems Local and metropolitan area networks—Specific requirements,Part 11: Wireless LAN Medium Access Control (MAC) and Physical Layer (PHY) Specifications, section 9.3.1.8 , pp. 1-6, year 2016.

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", pp. 1-536, Oct. 29, 2009.

IEEE P802.11ax™/D3.3, IEEE Draft Standard for Information Technology—Telecommunications and Information Exchange Between Systems Local and Metropolitan Area Networks—Specific Requirements , Part 11: Wireless LAN Medium Access Control (MAC) and Physical Layer (PHY) Specifications, Amendment 1 : Enhancements for High Efficiency WLAN, pp. 1-730, Dec. 2018.

IEEE Standard 802.11ac, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz", pp. 1-425, Dec. 2013.

International Application # PCT/IB2019/054429 search report dated Nov. 21, 2019.

* cited by examiner

DISTRIBUTED MIMO BASED ON ACCESS POINT COLLABORATION

CROSS-REFERENCE TO RELATED APPLICATIONS

This application is a division of U.S. patent application Ser. No. 16/424,532, filed May 29, 2019, which claims the benefit of U.S. Provisional Patent Application 62/677,949, filed May 30, 2018; U.S. Provisional Patent Application 62/694,800, filed Jul. 6, 2018; U.S. Provisional Patent Application 62/730,407, filed Sep. 12, 2018; U.S. Provisional Patent Application 62/774,782, filed Dec. 3, 2018; and U.S. Provisional Patent Application 62/783,144, filed Dec. 20, 2018. All of these related applications are incorporated herein by reference.

FIELD OF THE INVENTION

The present invention relates generally to communication networks, and particularly to apparatus and methods for spatial multiplexing of communications between access points and client stations.

BACKGROUND

Multiple-Input Multiple-Output (MIMO) is an important component for many modern wireless technologies. MIMO increases the data-carrying capacity of a transmitter-receiver link by using multiple antennas to transmit and receive signals over multiple different paths. In wireless local area networks (WLANs, also known as Wi-Fi), for example, the IEEE 802.11n standard defines MIMO communications between an access point (AP) and a client station (STA) with multiple antennas, which enable compatible products to achieve higher data rates than earlier-generation Wi-Fi equipment.

Multi-user MIMO (MU-MIMO) is a multiple-access enhancement of MIMO technology that uses spatial multiplexing over multiple antennas to enable multiple transmitters to transmit signals simultaneously to the same receiver and/or multiple receivers to receive signals simultaneously from the same transmitter. MU-MIMO for WLANs is defined, for example, in the IEEE 802.11ac and 802.11ax specifications, which permit multiple client stations (STAs), to transmit or receive independent data streams simultaneously to or from the same AP by space-division multiple access (SDMA).

Another type of MIMO, which has been developed for use in Long Term Evolution (LTE) cellular networks, is cooperative MIMO, in which multiple devices, each with its own antenna or antennas, are grouped into a virtual antenna array to achieve MIMO communications. These cooperative MIMO functionalities take advantage of the fact that all base station clocks in an LTE network are precisely synchronized continuously. For example, LTE 4G standards have introduced the use of Coordinated Multipoint (CoMP) communications, in which neighboring cellular base stations share data and channel state information in order to coordinate their downlink transmissions to user equipment and to jointly process the uplink signals that they receive. CoMP and other cooperative MIMO schemes can increase the data capacity of wireless networks significantly by enhancing exploitation of the spatial domain, but at the expense of increased complexity in control and communication between the cooperating transmitters and receivers.

SUMMARY

Embodiments of the present invention that are described hereinbelow provide improved apparatus and methods for wireless network communications.

There is therefore provided, in accordance with an embodiment of the invention, a method for communication in a WLAN, which includes associating a client station (STA) with a basic service set (BSS) of a first access point (AP), having first antennas, in a wireless local area network (WLAN). A second AP, having second antennas, in the WLAN is synchronized with the first AP. Distributed beamforming parameters are computed over a group of the first antennas and the second antennas. Data for transmission to the STA are distributed to both the first AP and the second AP. The distributed data are transmitted to the STA from the first AP via the first antennas in the group and the second AP via the second antennas in the group in synchronization in accordance with the distributed beamforming parameters.

In some embodiments, synchronizing the second AP includes exchanging synchronization signals between the first AP and the second AP over a backbone network. In one embodiment, exchanging the synchronization signals includes synchronizing respective clocks and frequency offsets of the second AP with the first AP.

In a disclosed embodiment, associating the STA includes providing from the first AP to the STA a BSS identifier (BSSID) of the first AP, and transmitting the distributed data includes transmitting signals from both the first AP and the second AP using the BSSID of the first AP. Typically, transmitting the signals includes conveying encoding parameters to the second AP that are identical to the encoding parameters applied by the first AP, and encoding the distributed data for transmission by both the first AP and the second AP using the identical encoding parameters.

In some embodiments, the first and second APs have respective first and second numbers of antennas, and the group includes a third number of the antennas, which is greater than the first and second numbers.

In one embodiment, computing the distributed beamforming parameters includes receiving from the STA, at the first AP, a request to establish the group of the antennas together with the second AP, and setting up the group in response to the request. Alternatively, computing the distributed beamforming parameters includes collecting information at the first AP with respect to neighboring APs in the WLAN, and selecting the second AP responsively to the collected information.

In a disclosed embodiment, computing the distributed beamforming parameters includes transmitting null data packets (NDPs) from both the first AP and the second AP to the STA, receiving channel feedback from the STA in response to the NDPs, and computing, responsively to the channel feedback, a steering matrix to be applied to downlink signal vectors.

Alternatively, computing the distributed beamforming parameters includes receiving uplink signals from the STA at the first AP and the second AP, and computing, by implicit beamforming based on the uplink signals received at both the first AP and the second AP, a steering matrix to be applied to downlink signal vectors. In a disclosed embodiment, computing the steering matrix by implicit beamforming includes computing calibration factors among the antennas of each of the first and second APs individually, and then computing a common calibration factor across both of the first and second APs.

Typically, transmitting the distributed data includes encoding the data for transmission at both the first AP and the second AP identically in accordance with a specified procedure and encoding parameters. Additionally or alternatively, distributing the data for transmission includes broadcasting complex modulated symbols, which encode the data, to be transmitted by the first AP and the second AP.

In one embodiment, transmitting the distributed data includes applying, by at least one of the APs, a pre-compensation for a frequency offset in signals that are transmitted from the APs to the STA.

Additionally or alternatively, computing the distributed beamforming parameters includes determining amplitude and phase values to be applied in transmitting the data via each of the first and second antennas. Further additionally or alternatively, computing the distributed beamforming parameters includes computing precoding matrices to be applied to the data for transmission.

In some embodiments, associating the STA includes associating at least a first STA and a second STA with the BSS of the first AP, and computing the distributed beamforming parameters includes computing different, respective first and second beamforming parameters for downlink communications with the first STA and the second STA. In one embodiment, the method further includes synchronizing a third AP, having third antennas, in the WLAN with the first AP, wherein computing the different, respective first and second beamforming parameters includes computing the first beamforming parameters over a first group of the first antennas and the second antennas, and computing the second beamforming parameters over a second group of the first antennas and the third antennas, and wherein transmitting the distributed data includes transmitting first signals to the first STA from the first and second APs in accordance with the first beamforming parameters and transmitting second signals to the second STA from the first and third APs in accordance with the second beamforming parameters.

There is also provided, in accordance with an embodiment of the invention, a method for communication, which includes respectively associating each of a plurality of client stations (STAs), including at least a first STA and a second STA, with at least one basic service set (BSS) of at least one access point (AP) among a plurality of APs, having respective antennas, in a wireless local area network (WLAN). The APs in the WLAN are synchronized prior to transmitting data to the STAs. Respective first and second groups of the antennas are defined for downlink communication with the first and second STAs, each of the groups including antennas belonging to at least two of the APs. First distributed beamforming parameters are computed over the first group of the antennas for downlink communications with the first STA, and second distributed beamforming parameters, different from the first distributed beamforming parameters, are computed over the second group of the antennas for downlink communications with the second STA. Respective data for transmission to the first and second STAs are distributed to the APs to which the antennas in the respective first and second groups belong. The distributed data are transmitted to the first and second STAs from the APs via the first and second groups of the antennas in synchronization in accordance with the first and second distributed beamforming parameters.

In a disclosed embodiment, transmitting the distributed data includes transmitting signals simultaneously to both of the first and second STAs via the first and second groups of the antennas.

In one embodiment, respectively associating each of the plurality of the STAs includes associating the first STA and the second STA with the same BSS. Alternatively, the plurality of APs includes at least a first AP and a second AP, and respectively associating each of the plurality of the STAs includes associating the first STA with a first BSS of a first AP and associating the second STA with a second BSS, different from the first BSS, of the second AP.

There is additionally provided, in accordance with an embodiment of the invention, a wireless local area network (WLAN) system for communication, including a first access point (AP), having first antennas and a basic service set (BSS), which is configured to associate with a client station (STA) in a wireless local area network (WLAN). A second AP in the WLAN, having second antennas, is configured to synchronize with the first AP. At least one processor is configured to compute distributed beamforming parameters over a group of the first antennas and the second antennas, and to distribute data for transmission to the STA to both the first AP and the second AP, wherein the first AP and the second AP transmit the distributed data to the STA via the first antennas in the group and the second antennas in the group, respectively, in synchronization in accordance with the distributed beamforming parameters.

In one embodiment, the at least one processor is disposed in at least one of the first and second APs. Alternatively or additionally, the at least one processor is disposed in a hardware unit that is separate from the first and second APs.

There is further provided, in accordance with an embodiment of the invention, a wireless local area network (WLAN) system, including a plurality of access points (APs) having respective antennas, the antennas being configured to associate with a plurality of client stations (STAs) in a wireless local area network (WLAN), the WLAN including at least a first STA and a second STA, such that each STA is associated with at least one basic service set (BSS) of at least one AP among the plurality. At least one processor is configured to synchronize the APs in the WLAN, and to define respective first and second groups of the antennas for downlink communication with the first and second STAs, each of the groups including antennas belonging to at least two of the APs, and to compute first distributed beamforming parameters over the first group of the antennas for downlink communications with the first STA, and second distributed beamforming parameters, different from the first distributed beamforming parameters, over the second group of the antennas for downlink communications with the second STA, and to distribute respective data for transmission to the first and second STAs to the APs to which the antennas in the respective first and second groups belong. The access points transmit the distributed data to the first and second STAs via the first and second groups of the antennas in synchronization in accordance with the first and second distributed beamforming parameters.

In one embodiment, the distributed beamforming parameters include a steering matrix to be applied to downlink signal vectors transmitted to the first and second STAs.

The present invention will be more fully understood from the following detailed description of the embodiments thereof, taken together with the drawings in which:

DETAILED DESCRIPTION OF EMBODIMENTS

MU-MIMO technologies, as specified in the 802.11ac and 802.11ax standards, for example, increase the speed and capacity of Wi-Fi networks. Existing approaches, however, still fail to take full advantage of available spatial resources, and therefore cannot fully address the growing bandwidth needs in crowded wireless network environments, such as large offices and public spaces. In these existing approaches, each AP in the WLAN operates independently of its neighbors, with its own basic service set (BSS) and its own frequency allocation. Each STA can associate and communicate with only one AP at any given time, and signals that the STA receives from other APs are treated as interference.

Embodiments of the present invention that are described herein address this problem by enabling APs in a WLAN to collaborate in serving STAs, by means of distributed MIMO (DMIMO) schemes among APs whose normal operation is not mutually synchronous. In DMIMO, two or more APs transmit data to a STA in synchronization, so that the antennas of the collaborating APs operate together as a virtual antenna array. By extending the antenna arrays in the WLAN in this manner, the DMIMO approach is able to take advantage of unused AP transmitter capacity to increase beamforming gain and thus increase downlink data throughput, reliability and range of the network. The STAs receive signals with higher power and improved signal/interference ratio. For example, using two APs together, each with four antennas, in DMIMO transmission to a STA operating in accordance with the 802.11ax standard, the inventors were able to achieve a peak transmission throughput of 2000 Mbps at a range of 50 feet, as opposed to only 1400 Mbps with a single AP. In this same configuration, the maximum range for DMIMO transmission at 250 Mbps was 210 feet, as opposed to only 150 feet using a single AP.

To realize these benefits, it is necessary that the APs in a given WLAN environment operate in mutual synchronization—in contrast to the independent, unsynchronized operation of APs in WLANs that are known in the art. To achieve this synchronization, the APs communicate among themselves over a backbone network, such as a wired network (for example, an Ethernet LAN, to which APs are connected for purposes of Internet access in most deployments), or a wireless network, which may be a dedicated network or implemented over a channel of the WLAN itself. The collaborating access points communicate over the backbone network to establish DMIMO groups, to synchronize time, frequency and carrier phase across the groups, and to distribute data for transmission to the client STAs, all in real time. Beamforming parameters for each DMIMO client STA are established over the corresponding group of APs and adjusted as necessary to adapt to channel fluctuations.

In some embodiments, all of these functions are carried out among the APs without requiring any cooperation by client STAs, beyond the signaling capabilities that are already mandated by existing IEEE 802.11 standards. In other words, the clients need not request DMIMO service or even be aware that they are being served by more than a single AP. The changes required in an existing WLAN to offer DMIMO service can be implemented entirely in software or firmware, taking advantage of the existing infrastructure, in accordance with an embodiment.

In the disclosed embodiments, DMIMO service is initiated when a given client STA associates with a basic service set (BSS) of a given AP in a WLAN. One or more other, neighboring APs are synchronized and paired with the given AP, typically by synchronization and pairing processes that take place periodically within the WLAN. (Alternatively or additionally, these processes could take place ad hoc, in response to a request by the STA, for example, although such a request may not be required in at least some embodiments). An AP controller decides whether the given STA is to receive DMIMO service and, if so, selects the neighboring AP (or possibly multiple neighboring APs) that is to participate in providing the DMIMO service. The AP controller may be a software or firmware function implemented on the host processors of the APs themselves, or it may alternatively be implemented in a separate hardware unit.

After selecting the APs that are to participate in the DMIMO service, the controller and/or APs compute distributed beamforming parameters over the group of antennas belonging to the APs. (This antenna group can typically comprise a larger number antennas than any single AP has itself, thus improving the beamforming performance still further.) The controller may distribute data for transmission to the STA to all of the APs in the groups. Alternatively, the data may originate from another source (such as an internet server), and the controller decides the schedule of packet transmission by each AP. These APs transmit the data to the STA via their respective antennas in synchronization using the distributed beamforming parameters. The transmissions from all the APs use the BSS identifier (BSSID) of the given AP, with which the STA has associated, so that the STA can receive and process the downlink signals in the standard fashion, without any awareness that they were transmitted by multiple APs.

Although the embodiments described below relate, for the sake of simplicity and clarity, mainly to the steps involved in DMIMO transmission to a single STA, in practice the APs in the WLAN will provide DMIMO service to multiple STAs concurrently. For example, when multiple STAs associate with the BSS of a given AP and are served by the given AP together with a neighboring AP, different, respective beamforming parameters will be computed and implemented for downlink communications with each of the STAs. In some cases, different neighboring APs will participate in the respective DMIMO groups serving different STAs.

Scenarios of this sort, in which a groups of APs transmits DMIMO signals simultaneously to multiple STAs, are referred to herein as distributed downlink multi-user MIMO (DL-MUMIMO). In some of these scenarios, the participating STAs may be associated with the (different) BSSIDs of different APs. In this case, for example, a first STA may associate with a first AP and may receive DMIMO transmissions from a second STA together with the first STA, as described above, using the BSSID of the first AP. At the same time, a second STA may associate with the second AP, and receive DMIMO transmissions from the first and second APs using the BSSID of the second AP. More complex scenarios, involving multiple other APs in the WLAN, can be supported in the same manner, with a respective antenna group assigned and beamforming parameters computed for each client STA. In this manner, the entire, collective downlink capacity of the APs in the WLAN may be better used to exploit available spatial, temporal and frequency resources; in some embodiments all such spatial, temporal and frequency resources are used.

Figure 1:
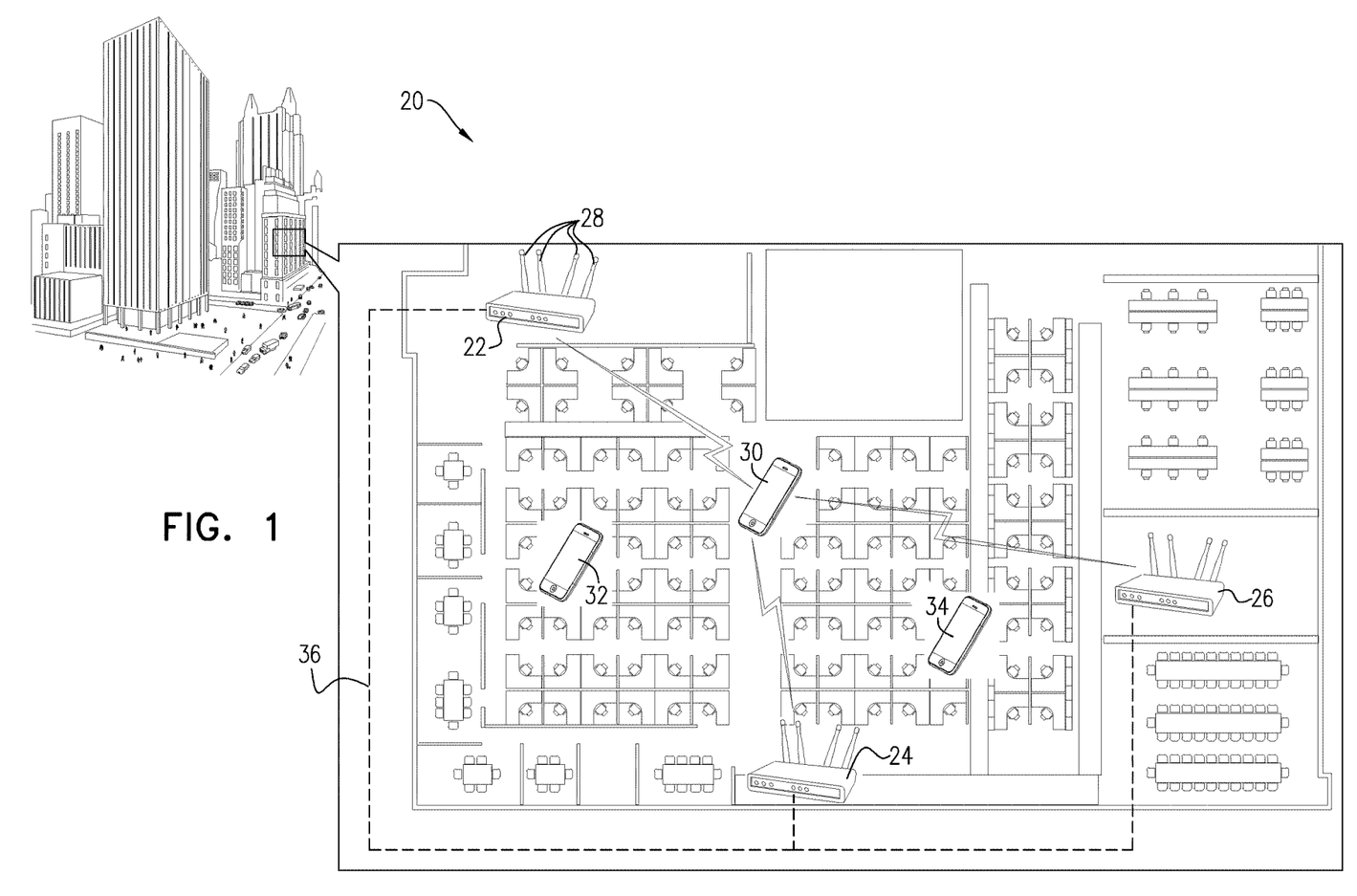
FIG. 1 is schematic pictorial illustration of a wireless network system, in accordance with an embodiment of the invention.
Figure 2:
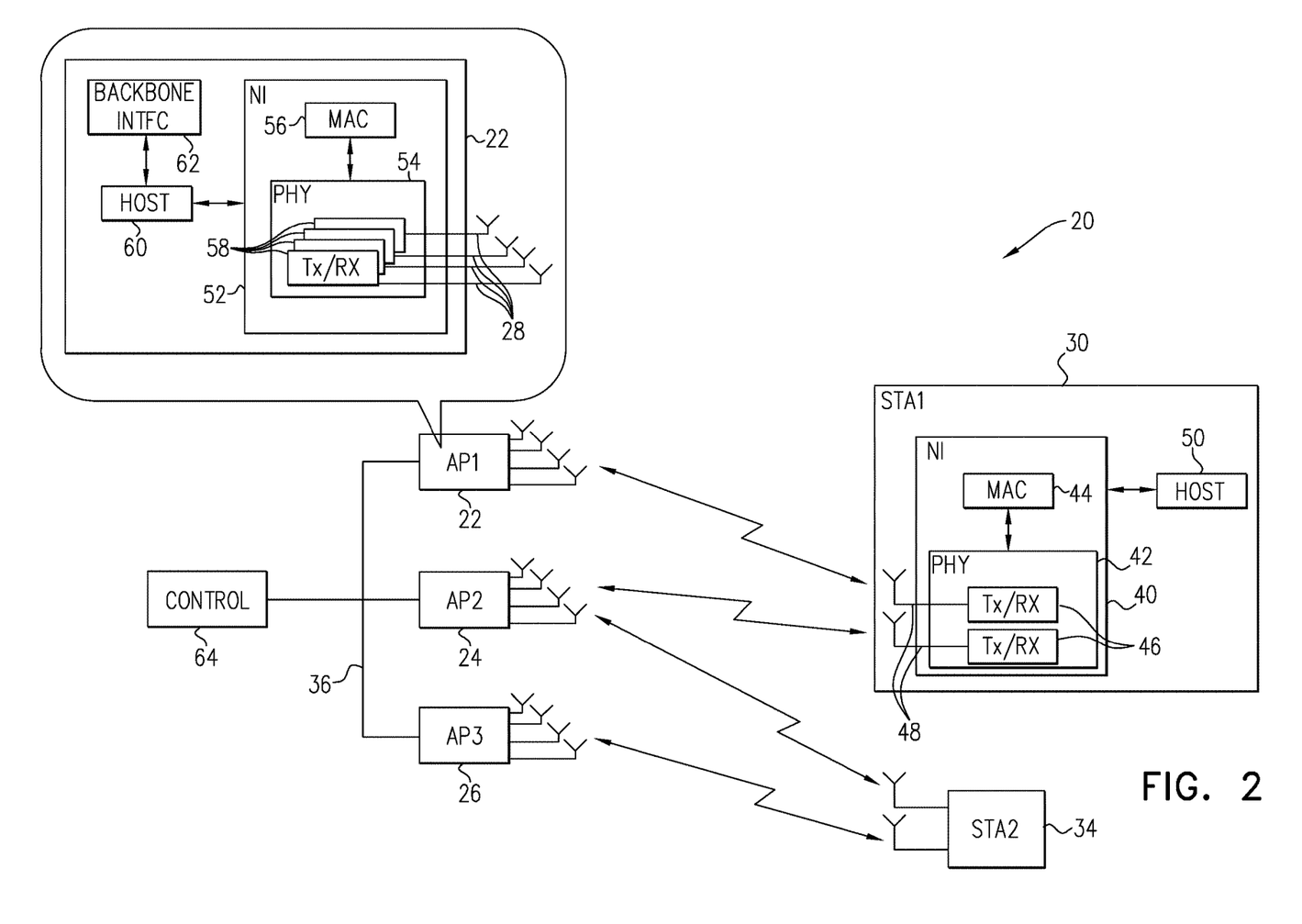
FIG. 2 is a block diagram showing functional components of the system of FIG. 1, in accordance with an embodiment of the invention.

Reference is now made to FIGS. 1 and 2, which schematically illustrate a wireless network system 20, in accordance with an embodiment of the invention. FIG. 1 shows an overview of the operating environment, while FIG. 2 is a block diagram showing functional components of the system.

In system 20, APs 22, 24, 26, . . . , having respective arrays of antennas 28, collaborate in providing DMIMO service to client STAs 30, 32, 34, . . . . Each STA typically associates with the AP from which it receives the strongest signals, but may then receive, in addition, DMIMO signals from one or more of the antennas 28 of one or more additional APs in its vicinity. In the example shown in FIG. 1, STA 30 (labeled STA1 for convenience) receives signals from both AP 22 (AP1) and AP 24 (AP2). Meanwhile, STA 34 (STA2) receives signals from AP 24 and AP 26 (AP3). As noted earlier, APs 22, 24, 26, . . . , are connected by a backbone network 36, over which they transmit and receive synchronization and control signals, as well as data. APs exchange synchronization communications over backbone network 36 prior to commencing DMIMO communication with a STA.

As shown in FIG. 2, STA 30 comprises a network interface (NI) 40, which comprises PHY and medium access control (MAC) interfaces 42 and 44, in accordance with the IEEE 802.11 specifications. PHY interface 42 comprises one or more radio transceivers 46, which are connected to antennas 48. In the pictured embodiment, PHY interface 42 comprises two such transceivers, each with its own antenna. Alternatively, larger or smaller numbers of transceivers and antennas may be used, with one or more antennas connected to each transceiver. The internal construction of STAs 32 and 34 is typically similar to that of STA 30. In general, the components of PHY and MAC interfaces 42 and 44 are implemented in dedicated or programmable hardware logic circuits, on a single integrated circuit chip or a set of two or more chips.

A host processor 50 passes data to network interface 40 for transmission over the air to target AP receivers, and receives incoming data from network interface 40. Host processor 50 typically comprises a microprocessor, along with a suitable memory and other resources (not shown), and is programmed in software or firmware to carry out various control and communication functions in STA 30. The software may be stored in tangible, non-transitory computer-readable media, such as a suitable RAM or ROM memory. Host processor 50 may be implemented together with the elements of network interface 40 in a single system-on-chip (SoC), or as a separate chip or chip set.

The internal construction of APs 22, 24, 26, . . . , as shown in the inset in FIG. 2, is generally similar to that of STA 30. AP 22 comprises a network interface (NI) 52, which comprises PHY and MAC interfaces 54 and 46, again in accordance with the applicable IEEE 802.11 specifications. PHY interface 54 comprises multiple radio transceivers 58, which are connected to antennas 28. In the pictured embodiment, PHY interface 42 comprises four such transceivers, each with its own antenna. Alternatively, larger or smaller numbers of transceivers and antennas may be used, with one or more antennas connected to each transceiver. In general, the components of PHY and MAC interfaces 54 and 56 are implemented in dedicated or programmable hardware logic circuits, on a single integrated circuit chip or a set of two or more chips.

A host processor 60 passes data to network interface 52 for transmission over the air to target receivers, and receives incoming data from network interface 52. Host processor 60 also communicates with other APs over backbone network 36, using a backbone interface 62, such as an Ethernet interface, a WLAN interface, or a mesh network interface. When backbone network 36 is a wired Ethernet network, for example, backbone interface 62 comprises suitable Ethernet PHY and MAC circuits. Alternatively, backbone interface 62 may comprise a wireless network interface, and may even be integrated with NI 52 when backbone network 36 is integrated into the WLAN. In this case, backbone interface 62 may use the bandwidth of the WLAN in particular time slots (i.e., TDMA) and/or within a particular frequency channel or channels (FDMA).

Host processor 60 typically comprises a programmable processor, along with a suitable memory and other resources (not shown), and is programmed in software or firmware to carry out various control and communication functions in AP 22. These functions include the DMIMO-related functions carried out by the AP in connection with synchronization and computation of beamforming and other parameters, which are then implemented by NI 52. The software run by host processor 60 is suitably stored in tangible, non-transitory computer-readable media, such as a suitable RAM or ROM memory in various embodiments. Host processor 60 may be implemented together with the elements of network interface 52 and backbone interface 62 in a single system-on-chip (SoC), or as a separate chip or chip set.

A DMIMO controller 64, which may be a standalone device or may be integrated in one or more of the APs, is connected to backbone network 36 and coordinates functions such as pairing of APs to serve STAs in system 20 and distributing data to the APs for transmission to the STAs they are serving. Controller 64 may comprise a standalone unit, including a processor executing the required software code and a suitable wired or wireless interface to backbone network 36 (similar to interface 62, as described above). Alternatively or additionally, DMIMO controller 64 may be embedded as an additional processor in one or more of APs 22, 24, 26, . . . , or as a software process running on host processor 60 of one or more of the APs, or as a distributed process running on multiple APs or all of the APs. All such implementations are considered to be within the scope of the invention, and references to "DMIMO controller 64" should be understood as encompassing all of these implementation options, unless the context indicates otherwise.

The DMIMO-enabled APs in system 20 share some basic information with one another, such as geographical location, protocols supported, and DMIMO capabilities and support. Some APs may claim the capability to act as the controller to form a DMIMO network.

Alternatively, a gateway router (not shown) in system 20 can act as controller. Since all data coming from outside system is routed by this device, the gateway router can distribute the DMIMO data and provide instructions to the DMIMO APs as to how they should cooperate.

Figure 3:
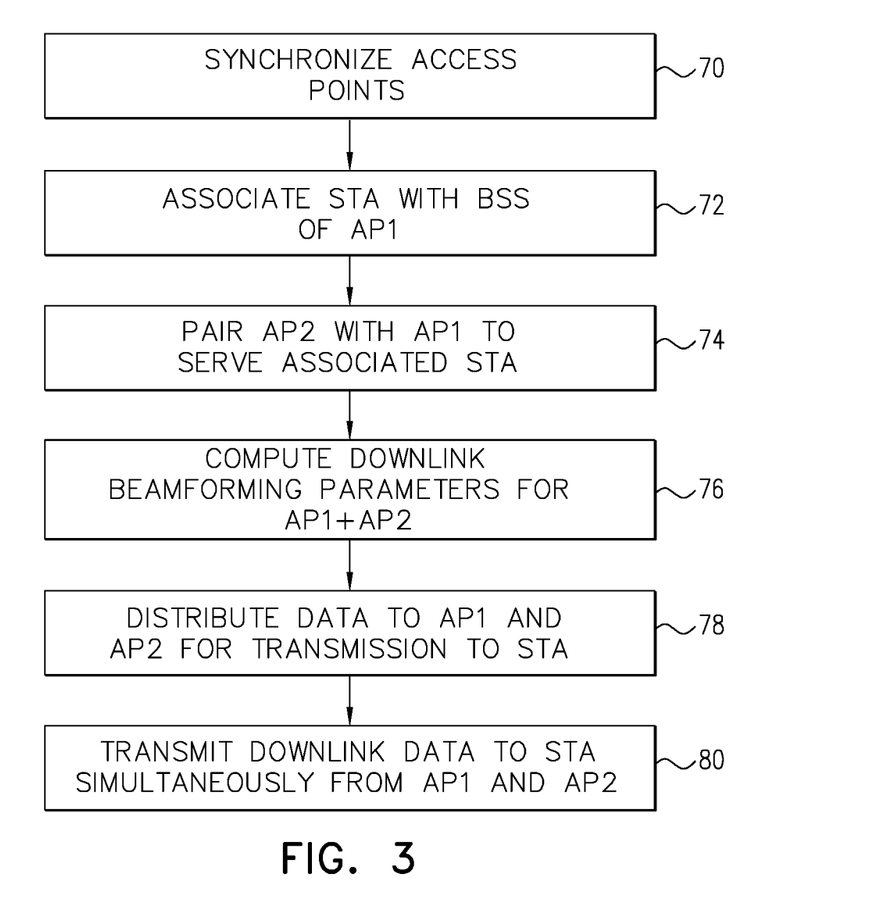
FIG. 3 is a flow chart that schematically illustrates a method for distributed MIMO (DMIMO) communications that can be implemented, for example, in the system of FIG. 1, in accordance with an embodiment of the invention.

FIG. 3 is a flow chart that schematically illustrates a method for distributed MIMO (DMIMO) communications, in accordance with an embodiment of the invention. The method is described hereinbelow, for the sake of convenience and clarity, with specific reference to the elements of system 20, as shown in FIGS. 1 and 2. Alternatively, the principles of the present method may be implemented in other suitable sorts of WLAN environments.

To enable DMIMO operation, the local clocks of APs 22, 24, 26, . . . , in system 20 are synchronized with one another, at an AP synchronization step 70. This step is typically carried out by exchanging synchronization signals among the APs over backbone network 36, for example, by transmitting and receiving synchronization packets using the Precision Time Protocol (PTP), as is known in the art. Step 70 is performed at system start-up, and may be repeated periodically thereafter in order to keep the clocks within appropriate tolerance limits. Additionally or alternatively, the local clocks of APs 22, 24, 26, . . . , in system 20 can be synchronized on demand in response to trigger packets transmitted by client STAs, as described further hereinbelow. After receiving the trigger packet, the APs synchronize to the clock of the client and then synchronously transmit the downlink packet.

In order to initiate data communications, any given STA first establishes an association with an AP, at an association step 72. It will be assumed in this example, without loss of generality, that STA1 associates with the BSS of AP1, using the standard 802.11 communication protocol. As part of the association process, STA1 receives the BSSID of AP1 and will use this BSSID in subsequent communications.

Not all communications in system 20 are necessarily subject to DMIMO transmission. For example, when the STA is located in close proximity to a given AP and receives adequate signals from that AP alone, DMIMO may not be called for, and communications can continue using the conventional, single-AP model. Conditions and methods for triggering DMIMO operation under appropriate circumstances—by either AP1 or STA1—are described further hereinbelow.

When controller 64 receives a DMIMO trigger of this sort, it chooses another AP to pair with the AP that is already serving the STA, at an AP pairing step 74. For example, in the present case, controller 64 may determine that AP2 is in proximity to STA1, and may therefore pair AP2 with AP1 for the purpose of DMIMO communication with STA1. This pairing step may likewise be repeated periodically, for example in case STA1 moves within the service area of system 20, whereupon a different pairing is preferred. Additionally or alternatively, controller 64 may maintain a network database that lists neighboring APs for purposes of DMIMO pairing. Further additionally or alternatively, the client STA, such as STA1 in the present example, may detect and selecting the neighboring AP or APs to be paired with AP1 for DMIMO service.

The pair of AP1 and AP2 together have a larger number of available antennas than either of the APs individually, and some or all of these antennas can be used to serve STA1. For optimal performance (though not necessarily), the number of antennas 28 and corresponding transceivers 58 that will serve STA1 in DMIMO operation will typically be greater than the number of antennas and transceivers in either AP individually, thus achieving greater transmitted power and improved directionality.

Host processors 60 in AP1 and AP2 compute beamforming parameters for each antenna 28 that is going to transmit downlink signals to STA1, at a beamforming computation step 76. The beamforming parameters determine the amplitudes and relative phases of the signals that are to be transmitted by each of the participating antennas 28, in order to focus the combined antenna beams precisely at the location of STA1 while compensating for channel variations. Host processors 60 may compute the beamforming parameters, for example, on the basis of uplink signals received from STA1 at the antennas 28 in question, or alternatively by transmitting test downlink signals to STA1 from each antenna, and receiving channel feedback in return. The participating APs can compute the beamforming parameters over all the participating antennas, and thus for a higher spatial dimension than the number of transmit antennas (NumTxAnt) in each AP. This high-dimension computation is possible if the STA provides channel sounding feedback of sufficiently high order. Thus, multiple APs can truly beamform as though they were a single device with a higher value of NumTxAnt than the individual APs.

Controller 64 distributes data to AP1 and AP2 for downlink transmission to STA1, at a data distribution step 78. (As noted earlier, the functions of controller may be embodied in one or more of the APs or in a separate device; and the data may originate from another source, such as an Internet gateway.) AP1 and AP2 encode the data in appropriate signals for transmission to STA1, and apply the respective beamforming parameters to the signals in each of transceivers 58 in AP1 and AP2 that is participating in the DMIMO group. AP1 and AP2 then transmit the signals simultaneously, in mutual synchronization, via the corresponding antennas 28, to STA1, at a downlink transmission step 80. STA1 consequently receives the data with greater signal power and better spatial directionality than could have been provided by AP1 alone.

Figure 4A:
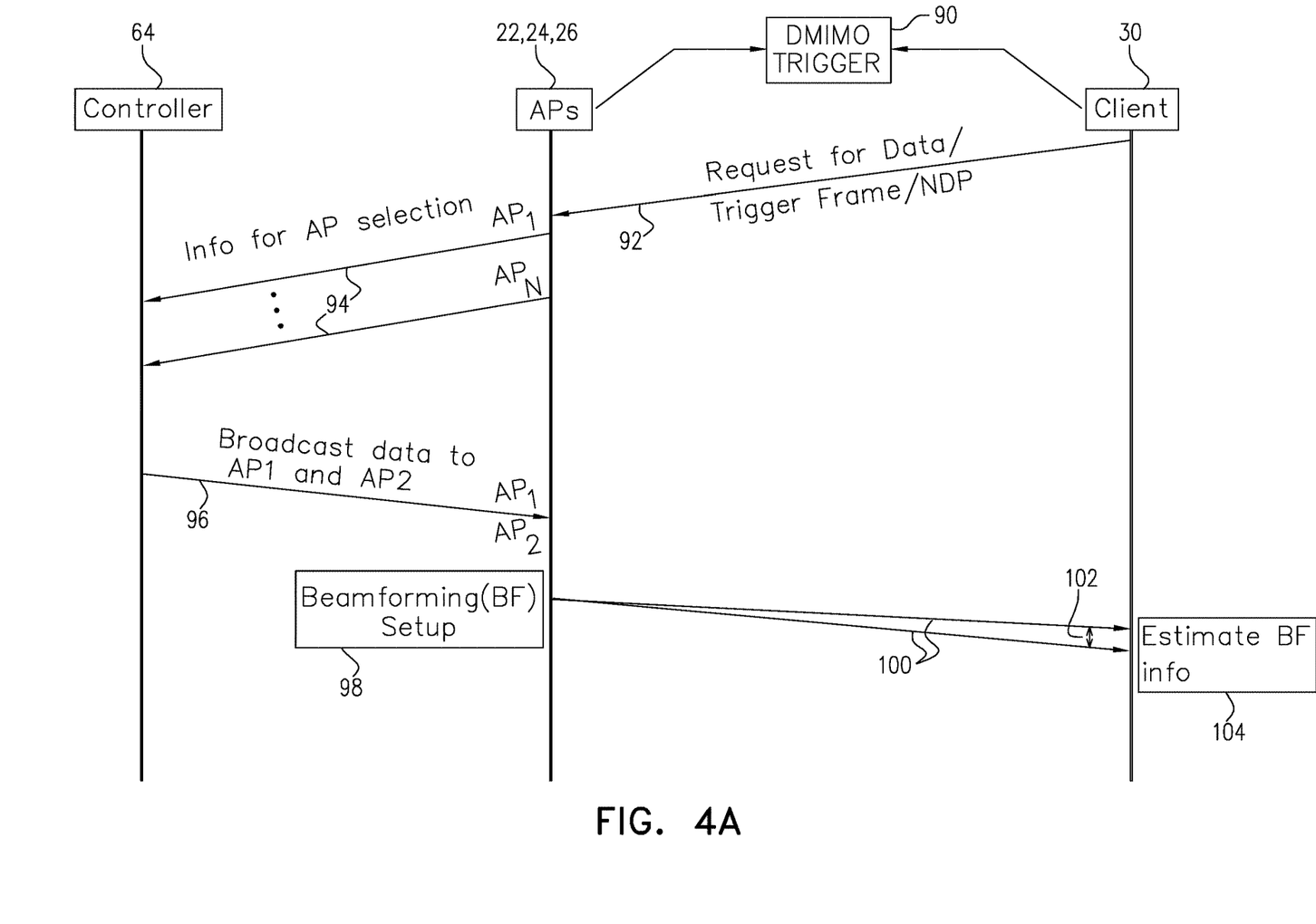
FIGS. 4A and 4B are a ladder diagram showing messages exchanged in a process of DMIMO communications, which can be used in implementing the method of FIG. 3, in accordance with an embodiment of the invention.
Figure 4B:
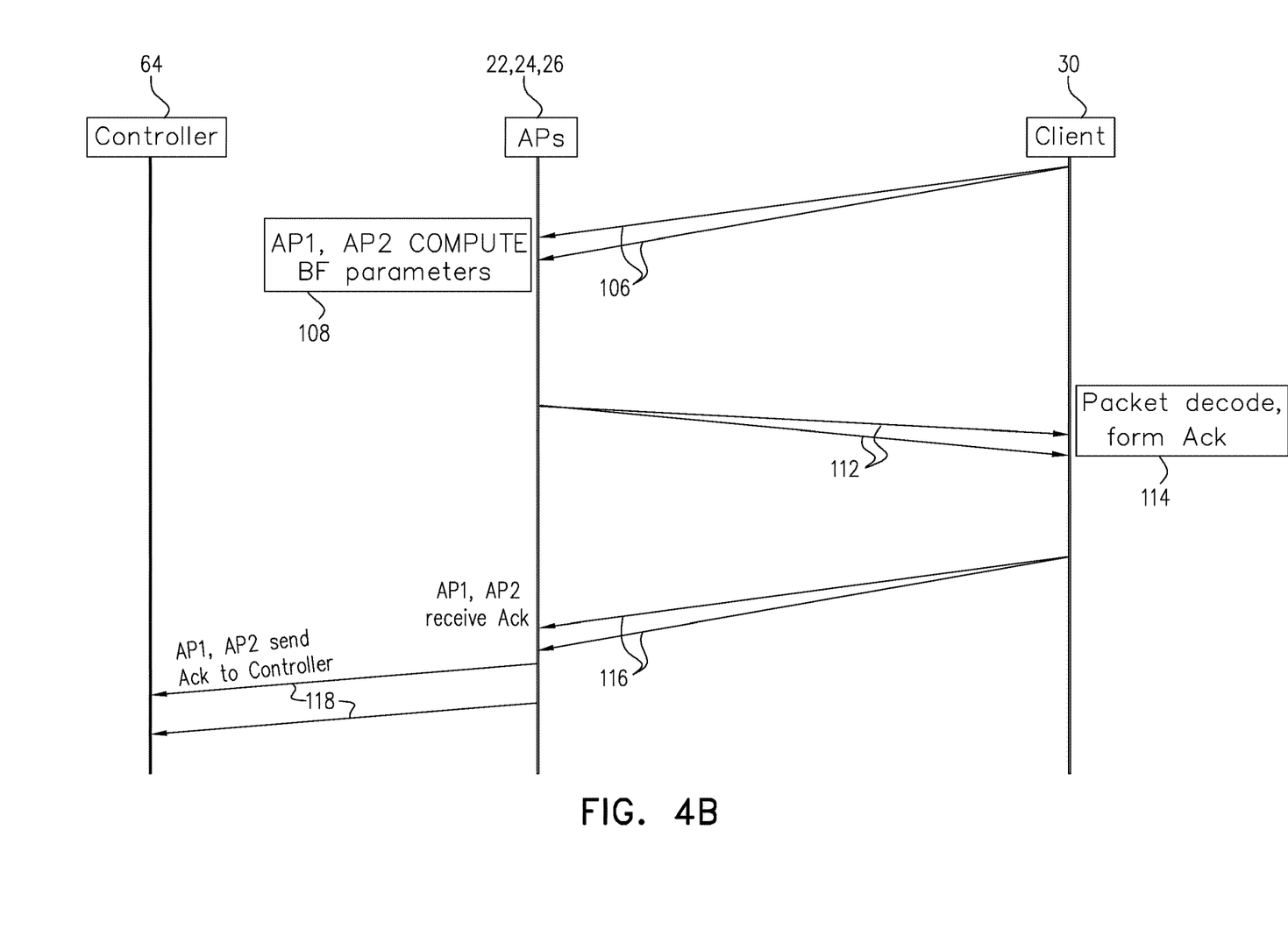

FIGS. 4A and 4B are a ladder diagram showing messages exchanged in a process of DMIMO communications, in accordance with an embodiment of the invention. FIGS. 4A/B give further details of possible implementations of the process outlined in FIG. 3.

After the client STA (for example, STA1) has associated with the BSS of the primary AP (for example, AP1) at step 72 (FIG. 3), DMIMO operation is initiated by a signal referred to as a DMIMO trigger 90, which can originate either from the client or from the AP with which the client STA previously associated (referred to herein as the associated AP). In the former case, referred to as client-initiated DMIMO, STA1 transmits a request to AP1 to establish a DMIMO group, based on information that it has collected regarding neighboring APs in the WLAN. In an embodiment, STA1 may initiate DMIMO particularly when it senses that the current downlink transmission quality is inadequate, for example when the signals from AP1 are weak (meaning that transmission range extension may be needed) or when a higher downlink transmission rate is required. In an alternative embodiment, in AP-initiated DMIMO, AP1 receives information with respect to its neighboring APs, and the DMIMO group is formed accordingly. AP-initiated DMIMO can be implemented without active involvement by the STA in setting up the DMIMO group, meaning that it can be used with unmodified, legacy STAs. This sort of operation with a legacy STA is possible because the signaling between the APs and the STA complies with existing protocols, and the STA need not be aware that the antennas from which it receives the downlink signals are physically attached to different APs.

Following DMIMO trigger 90, actual DMIMO operation begins with an uplink transmission 92 from STA1 to AP1. Transmission 92 can simply be a request for data in the case of AP-initiated DMIMO. In this case, AP1 can ask STA1 to provide a STA report identifying neighboring APs (by address and BSSID, for example) and the received channel power indicator (RCPI) for each AP. Based on this report, AP1 collects and sends information 94 for use in AP selection to controller 64. The controller then selects a neighboring AP to join into the DMIMO group, for example AP2, based on factors such as the strength of the RCPI and the current load on the neighboring AP in terms of the number of other STAs that are associated with it.

Alternatively, in the case of client-initiated DMIMO, transmission 92 may comprise a DMIMO trigger frame or a null-data packet (NDP) for the purpose of DMIMO initiation. The trigger frame may be of the form, for example, that is specified in section 9.3.1.22 of the IEEE 802.11ax™/D3.3 draft standard (December 2018), which is incorporated herein by reference. STA1 may send transmission 92 not only to the associated AP1, but also to other APs operating in the same frequency band. STA1 may obtain a report from AP1 of eligible neighboring APs and may then send transmission 92 on this basis, or it may assemble the list of neighboring APs itself based on transmissions received by STA1. In this manner, STA1 may actually select the neighboring AP to join into the DMIMO group. AP1 and the other APs receiving transmission 92 from STA1 then send information 94 to controller 64.

Once the DMIMO group has been selected—by any of the methods outlined above—controller 64 broadcasts signaling information 96 to the selected APs, assumed to be AP1 and AP2 in the present example. This broadcast takes place by transmission of appropriate packets over backbone network 36. As noted earlier, the backbone network may be wired or wireless, and the controller that performs the broadcast can be either embedded in one or more of the APs or in a separate device. Signaling information 96 indicates the medium access control (MAC) parameters to be applied by both AP1 and AP2 in communicating with STA1. In one embodiment, signaling information 96 may also include synchronization information for synchronizing the timing of subsequent downlink transmissions by AP1 and AP2.

Both AP1 and AP2 must use the same MAC parameters, including the BSSID of AP1, so that the downlink signals appear to STA1 as though they had all originated from AP1. Either AP1 or controller 64 provides the BSSID and other encoding parameters to the second AP, such as the MCS, NSS, FEC parameters, MAC header, and encryption key. Both APs will encode the downlink packets to STA1 using the identical encoding parameters, along with same BSSID. AP1 and AP2 will then retrieve and transmit the same data to STA1, with the same padding, encoding, interleaving and encryption. The "capabilities" field in the downlink packets will reflect the number of antennas (Ntx) and the number of data streams (Nss) transmitted over all of antennas 28 from both APs in the DMIMO group. (The Nss feature of the capability field is defined in section 27.15.4.2 of the above-mentioned IEEE 802.11ax standard, which is likewise incorporated herein by reference.) AP1 and AP2 will also compute and apply carrier frequency offset (CFO) and sampling frequency offset (SFO) pre-compensation to their respective downlink transmissions, as described further hereinbelow with reference to FIGS. 5 and 6.

Once the appropriate signaling has been set up, AP1 and AP2 begin a beamforming (BF) setup operation 98. For this purpose, AP1 and AP2 transmit an NDP 100 to STA1. These NDPs arrive at STA1 with a difference 102 in propagation delay, which will be taken into account in computing the beamforming parameters. (Subsequent synchronization of the transmission of downlink packets by AP1 and AP2 can be facilitated by transmission of a trigger packet from STA1, as described further hereinbelow with reference to FIG. 5.) In one embodiment, AP1 and AP2 each transmit a separate NDP 100. STA1 then estimates BF information 104 for each NDP separately and transmits a feedback frame 106 (FIG. 4B) with respect to each NDP. Feedback frame 106 may be of the form defined in sections 9.4.1.65 and 9.4.1.66 of the above-mentioned IEEE 802.11ax standard, which are also incorporated herein by reference.

If the process of separate transmission of NDP 100 by each of AP1 and AP2 is unduly time-consuming, AP1 and AP2 may alternatively send NDP 100 together, in a single, synchronized transmission, as though NDP 100 were transmitted from a single, "virtual AP." This option may require adjusting the number of antennas in use (Ntx) to the Nss capability of STA1. In this case, STA1 will estimate BF information 104 for the combined, virtual AP and send feedback frame 106 to AP1.

After collecting feedback frames 106 from STA1, AP1 and AP2 compute BF parameters 108 for subsequent use in DMIMO transmission to STA1. These parameters dictate the relative amplitudes and phases of the signals to be transmitted from each of the participating antennas 28. The BF parameters may be expressed in the form of a steering matrix to be applied to the downlink signal vectors (as explained in greater detail in the above-mentioned U.S. Provisional Patent Application 62/783,144, particularly on pages 28-32). Additionally or alternatively, AP1 and AP2 may apply the feedback from STA1 in computing precoding matrices to be applied to the downlink signals. For various DMIMO transmission implementations to a single STA, the precoding matrix is the steering matrix and is computed so as to maximize the signal/noise ratio of the downlink signals received by the STA. For various DL-MUMIMO implementations, the precoding matrix is computed so as to minimize interference experienced by each STA due to the downlink signals transmitted to other STAs.

AP1 and AP2 apply BF parameters 108 in transmitting downlink data packets 112 to STA1. Each AP transmits the same signal vector, with the same MAC parameters, in each packet, but with its own BF and precoding parameters applied to each antenna 28. In this manner, it is also possible for the APs together to transmit a larger number of data streams (Nss) to STA1 than either AP1 or AP2 could transmit on its own, thus taking greater advantage of the available network capacity (particularly when STA1 has a large number of available antennas). Encoding of the signal vector may take place entirely within AP1 and AP2. In this case, controller 64 passes the data bits of the message that is to be transmitted to AP1 and AP2, along with the procedure and parameters to be applied identically by both of the APs in encoding the data. Alternatively, to avoid duplicate computations, controller 64 may broadcast the complex modulated symbols to AP1 and AP2, which then apply the respective BF parameters to complete the encoding and transmission of packets 112.

STA1 receives and decodes packets 112 in order to extract transmitted data 114. The choice of BF parameters and the use of CFO/SFO pre-compensation enable STA1 to decode the signals as though they had originated from a single (virtual) AP. As explained earlier, there is no need for the STA to exercise any decoding capabilities in extracting data 114 beyond those that it would have applied to a MIMO transmission from a single AP.

After successfully decoding the data, STA1 forms and transmits an acknowledgment (ACK) packet 116. STA1 typically transmits only a single ACK packet, which is received by both AP1 and AP2. Reception of ACK packet 116 by the associated AP (i.e., AP1 in the present example) may be considered sufficient to complete the data communication successfully. If AP1 does not receive ACK packet 116, it may invoke retransmission of downlink data packets 112 by both AP1 and AP2. Alternatively, both AP1 and AP2 may send acknowledgment reports 118 to controller 64 upon receiving ACK packet 116; and the controller may determine that the data communication was successful if either (or both) of AP1 and AP2 reports having received the ACK packet.

The embodiment described above uses explicit measurement of downlink channel properties and feedback from the client STA is computing the BF parameters. In an alternative embodiment, the BF parameters, including the steering matrix, may be computed on the basis of the uplink signals, assuming channel reciprocality. This sort of approach, referred to as "implicit beamforming," is described in the above-mentioned U.S. Provisional Patent Application 62/783,144, particularly on pages 57-65. As explained in detail in this part of the provisional application, the implicit beamforming involves a two-stage calibration process: First calibration factors are computed among the antennas of each participating AP individually, and then a common calibration factor is computed across the multiple participating APs.

Figure 5:
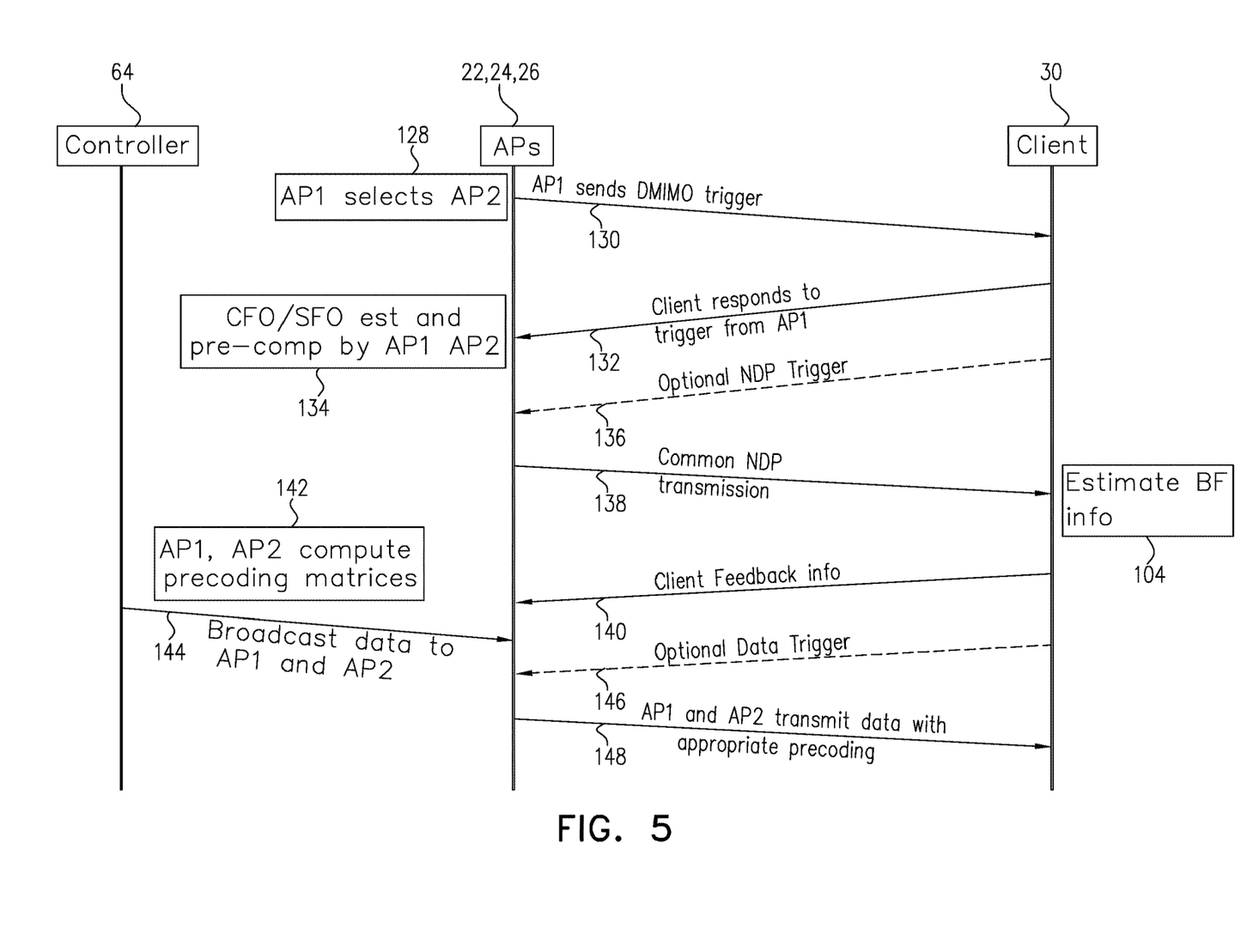
FIGS. 5 and 6 are ladder diagrams showing messages exchanged in a process of synchronization between access points, which can be used in implementing the method of FIG. 3, in accordance with embodiments of the invention.
Figure 6:
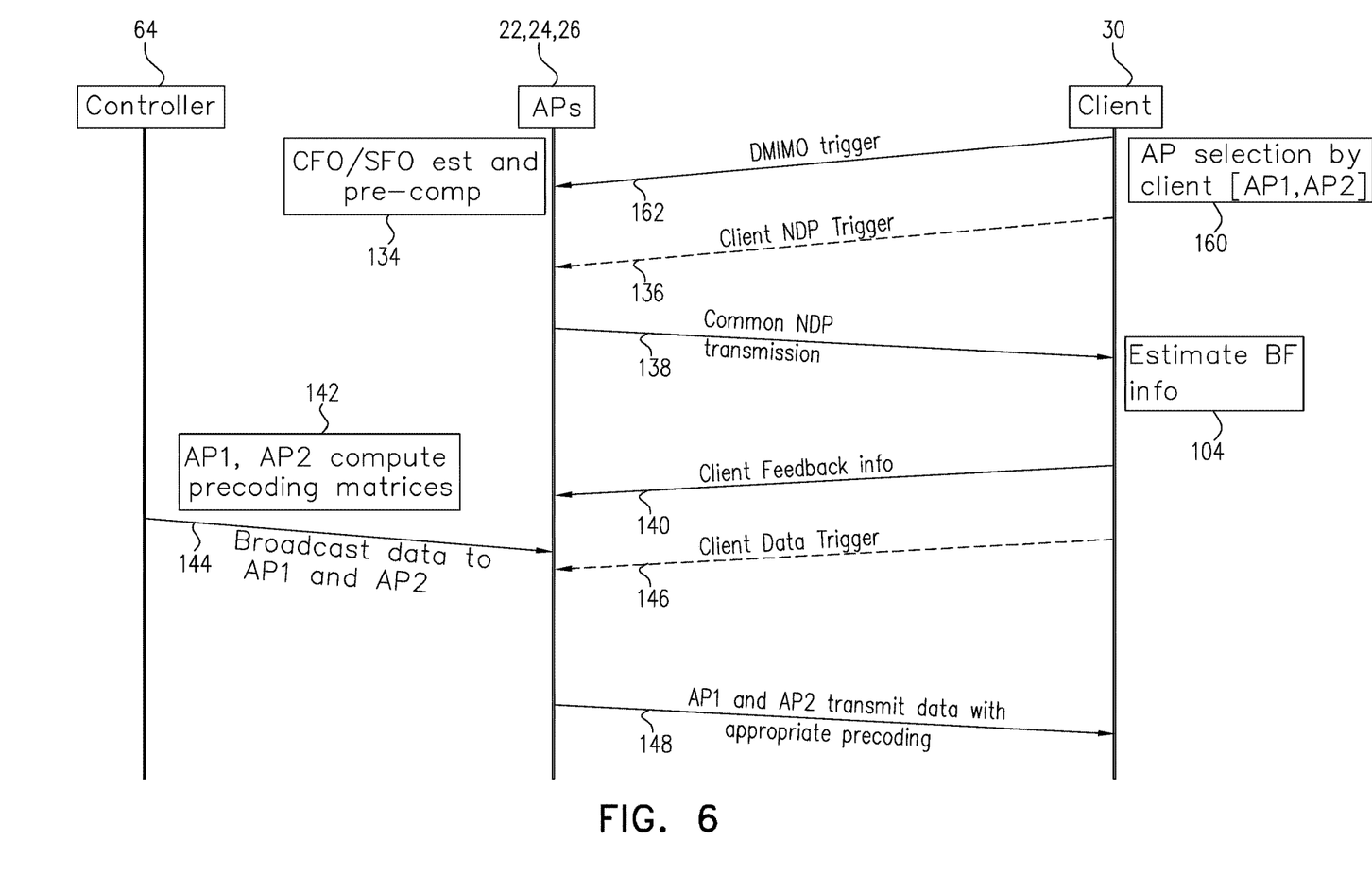

FIGS. 5 and 6 are ladder diagrams showing messages exchanged in the process of synchronization between access points AP1 and AP2, in accordance with embodiments of the invention. The embodiment of FIG. 5 depicts AP-initiated DMIMO, whereas that of FIG. 6 depicts client-initiated DMIMO. In other respects the two embodiments are similar, and the same reference numbers are used to refer to equivalent elements in both figures.

Ordinarily, when a STA receives signals from multiple antennas 28 for its associated AP, the carrier frequencies and sampling frequencies of the AP transceivers 58 can be assumed to be synchronized. (As noted earlier, the APs can be periodically resynchronized during operation of system 20, and they may also synchronize on demand in response to uplink trigger packets from client STAs.) The STA is thus able to compute a single CFO value and a single SFO value, corresponding to the offsets between the AP frequencies and those of the STA transceivers 46, and apply the CFO and SFO values to all the received downlink signals. In general, however, the clock, carrier frequency and sampling frequency of transceivers 58 in AP2 are subject to drift and thus are not precisely synchronized with those in AP1. To enable STA1 to apply the same CFO and SFO values to all of the downlink signals that it receives in DMIMO operation, AP1 and AP2 estimate the discrepancy between their respective carrier and sampling frequencies and then apply CFO/SFO pre-compensation to correct the discrepancy. This pre-compensation procedure is illustrated in FIGS. 5 and 6.

In the AP-initiated case of FIG. 5, AP1 associates with STA1 and makes a selection 128 of AP2 to join in DMIMO transmission. AP1 then sends a DMIMO trigger 130 to STA1, for example in the form of a suitable PHY protocol data unit (PPDU). STA1 sends a response 132 to this trigger, similarly in the form of a PPDU. Based on this response, both AP1 and AP2 measure the characteristics of the uplink channel and estimate their CFO and SFO relative to STA1. Based on these estimates, AP1 and AP2 apply appropriate CFO/SFO pre-compensation 134 to subsequent signals that they transmit. Optionally, STA1 may transmit a further NDP trigger 136 to assist AP1 and AP2 in accurate channel acquisition and pre-compensation. As a further option (not shown in the figures), AP2 may transmit and receive its own, separate signals to and from STA1 for purposes of channel acquisition and pre-compensation.

Using the pre-compensated CFO and SFO, AP1 and AP2 together transmit a common NDP 138 to STA1, which processes the received signals to estimate BF information 104 for the combined, virtual AP. STA1 sends a feedback frame 140 to AP1, reporting the BF information. On this basis, AP1 and AP2 compute respective precoding matrices 142.

Controller 64 broadcasts data 144 to AP1 and AP2, for transmission to STA1. The actual data transmission may optionally be initiated in response to a data trigger 146 from STA1, which can be useful in improving synchronization. AP1 and AP2 then transmit downlink data signals 148, while applying the appropriate pre-compensation and precoding to enable efficient reception and processing on the client side.

In client-initiated DMIMO, as shown in FIG. 6, the procedure is similar to that described above, but in this case STA1 is responsible for selection of a DMIMO group 160. After selecting the group of APs, STA1 sends a DMIMO trigger 162 to AP1 and AP2, which use the received signal in CFO/SFO pre-compensation 134. The synchronization and beamforming procedures then continue as described above.

Figure 7:
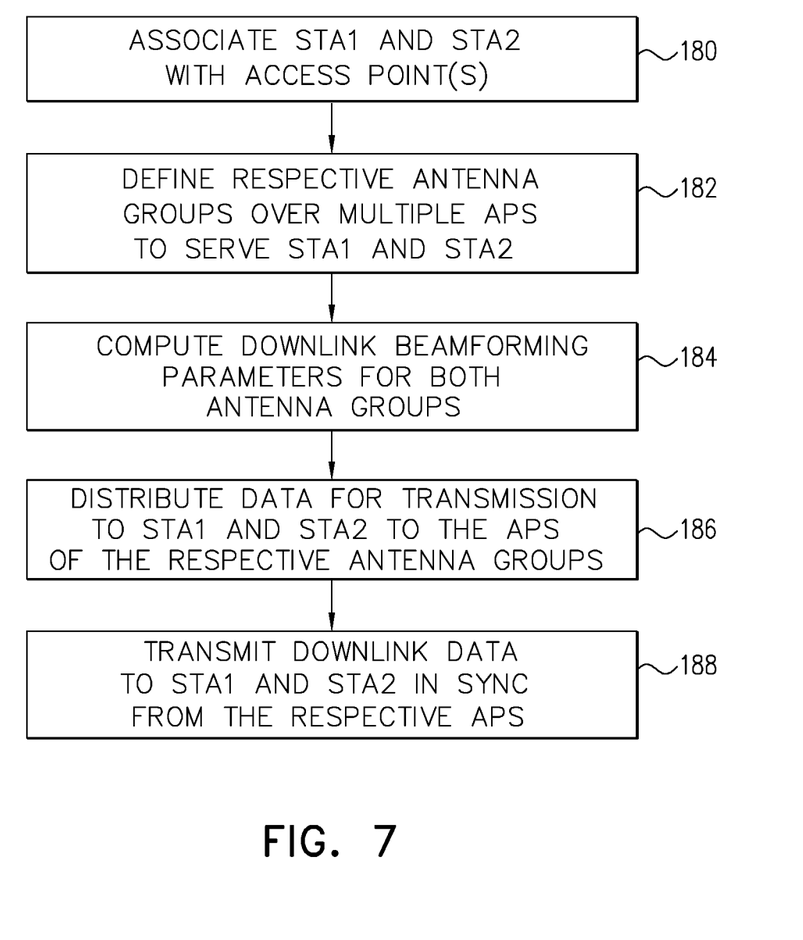
FIG. 7 is a flow chart that schematically illustrates a method for downlink multi-user MIMO (DL-MUMIMO) communications that can be implemented, for example, in the system of FIG. 1, in accordance with an embodiment of the invention.

FIG. 7 is a flow chart that schematically illustrates a method for downlink multi-user MIMO (DL-MUMIMO) communications, in accordance with an embodiment of the invention. The signal flow for DL-MUMIMO is similar to that described above for DMIMO to a single STA, but is adapted to enable multiple APs to serve multiple STAs simultaneously.

Referring back to FIG. 1 by way of example, DL-MUMIMO includes a variety of different use cases:

1. Both STA 30 and STA 32 associate with the BSS of AP 22 and receive DMIMO service from the antennas of AP 24 together with AP 22. AP 22 and AP 24 will compute and apply different, respective beamforming parameters for downlink communications with STA 30 and STA 32.
2. Both STA 30 and STA 34 associate with the BSS of AP 24. STA 30 receives DMIMO service from the antennas of AP 24 together with AP 22, while STA 34 receives DMIMO service from the antennas of AP 24 together with AP 26. Thus, the beamforming parameters for downlink transmission to STA 30 will be computed and applied by AP 24 and AP 22, while those for downlink transmission to STA 34 will be computed and applied by AP 24 and AP 26.
3. STA 30 associates with the BSS of AP 22, while STA 34 associates with the BSS of AP 26. Both STAs receive DMIMO transmissions from their respective, associated AP together with the antennas of AP 24.
4. STA 30 associates with the BSS of AP 22, while STA 32 associates with the BSS of AP 24. Both STA 30 and STA 32 receive DMIMO service from AP 22 and AP 24. In addition to the different, respective beamforming parameters for STA 30 and STA 32, AP 22 and AP 24 will also use different BSSIDs in the downlink communications: The downlink packets transmitted from AP 24 to STA 30 will use the BSSID of AP 22, while those transmitted from AP 22 to STA 32 will use the BSSID of AP 24.

The method of FIG. 7 is initiated when client STAs, for example STA1 and STA2, associate with respective APs (or possibly the same AP) in a WLAN, at an association step 180. Assuming an AP-triggered DMIMO model, as defined above, controller 64 (FIG. 2) instructs the associated APs to poll some or all of their client STAs for STA reports, indicating the neighboring APs from which each client STA is able to receive downlink signals. Based on this information, controller 64 defines a respective antenna group to serve each of STA1 and STA2, at a group selection step 182. This selection involves at least one neighboring AP, in addition to the associated AP, in accordance with whichever of the use-case models listed above is applicable.

The APs serving each STA collect beamforming information and compute downlink beamforming parameters for that STA, at a parameter computation step 184. This step can be carried out individually for each STA in substantially the same manner as was described above for the single-STA case. The one possible exception is in terms of pre-compensation for CFO and SFO (as explained above in reference to FIGS. 5 and 6): It is not practical for the APs in the WLAN to compute and apply a different CFO/SFO pre-compensation value in downlink transmission to each STA.

Therefore, at step 184, one of APs (for example, AP1) is selected by controller 64 to serve as the master AP for purposes of CFO/SFO. AP1 instructs each of the client STAs to transmit an NDP, as explained above. Both AP1 and the other APs in the WLAN receive the NDP and, on this basis, calculate their respective frequency offsets with respect to each client STA. AP1 computes baseline CFO and SFO values (for example, values that are averaged over the client STAs), and then broadcasts these value to the other APs. These other APs perform CFO/SFO pre-compensation relative to the baseline values, and thus synchronize their carrier frequencies and sampling frequencies relative to AP1. The client STAs will still need to correct for CFO and SFO in the downlink communications that they receive, but it will be the same correction for all APs in the network.

Following selection of the respective antenna group and computation of the respective beamforming parameters for each client STA, downlink data communications proceed in the fashion described above for single-client DMIMO. Controller 64 distributes data for transmission to each of STA1 and STA2 to the APs in the respective antenna group, at a data distribution step 186. The participating APs encode and transmit the data to each of STA1 and STA2 in mutual synchronization, at a data transmission step 188. The participating APs apply joint multi-user precoding to emulate downlink transmission from the entire group of antennas, thus enable simultaneous transmissions to STA1 and STA2.

It is also possible to take advantage of the features of orthogonal frequency divisional multiple access (OFDMA) that are provided by the 802.11 standards in conjunction with DL-MUMIMO operation. In this case, the APs serving a given client station will use the same OFDMA resource unit (RU) in transmitting to the client, and may also use the same preamble. Different DL-MUMIMO antenna groups, serving different clients, may operate in the same RU or in different RUs.

Although the description above relates to downlink transmissions, DMIMO groups may also be used advantageously in enhancing the quality of uplink reception, by increasing the uplink diversity gain. For example, assuming AP1 to be the associated access point for STA1, and AP2 to have been joined with AP1 in a DMIMO group, AP2 will also receive uplink transmissions from STA1. AP2 may decode these transmissions and compute a soft metric with respect to the data values in the received uplink packets. AP2 reports these metrics to AP1 via backbone network 36. AP1 combines these metrics with its own decoding results in order to decode the data with greater accuracy.

It will be noted that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
respectively associating each of a plurality of client stations (STAs), including at least a first STA and a second STA, with at least one basic service set (BSS) of at least one access point (AP) among a plurality of APs, having respective antennas, in a wireless local area network (WLAN);
synchronizing the APs in the WLAN prior to transmitting data to the STAs;
defining respective first and second groups of the antennas for downlink communication with the first and second STAs, each of the groups including antennas belonging to at least two of the APs;
computing first distributed beamforming parameters over the first group of the antennas for downlink communications with the first STA, and second distributed beamforming parameters, different from the first distributed beamforming parameters, over the second group of the antennas for downlink communications with the second STA;
distributing respective data for transmission to the first and second STAs to the APs to which the antennas in the respective first and second groups belong; and
transmitting the distributed data to the first and second STAs from the APs via the first and second groups of the antennas in synchronization in accordance with the first and second distributed beamforming parameters.

2. The method according to claim 1, wherein transmitting the distributed data comprises transmitting signals simultaneously to both of the first and second STAs via the first and second groups of the antennas.

3. The method according to claim 1, wherein synchronizing the APs comprises exchanging synchronization signals among the APs over a backbone network.

4. The method according to claim 3, wherein exchanging the synchronization signals comprises synchronizing respective clocks and frequency offsets of the APs.

5. The method according to claim 1, wherein respectively associating each of the plurality of the STAs comprises associating the first STA and the second STA with the same BSS.

6. The method according to claim 1, wherein the plurality of APs comprises at least a first AP and a second AP, and wherein respectively associating each of the plurality of the STAs comprises associating the first STA with a first BSS of a first AP and associating the second STA with a second BSS, different from the first BSS, of the second AP.

7. A wireless local area network (WLAN) system, comprising:

a plurality of access points (APs) having respective antennas, the antennas being configured to associate with a plurality of client stations (STAs) in a wireless local area network (WLAN), the WLAN including at least a first STA and a second STA, such that each STA is associated with at least one basic service set (BSS) of at least one AP among the plurality;

at least one processor configured to synchronize the APs in the WLAN, and to define respective first and second groups of the antennas for downlink communication with the first and second STAs, each of the groups including antennas belonging to at least two of the APs, and to compute first distributed beamforming parameters over the first group of the antennas for downlink communications with the first STA, and second distributed beamforming parameters, different from the first distributed beamforming parameters, over the second group of the antennas for downlink communications with the second STA, and to distribute respective data for transmission to the first and second STAs to the APs to which the antennas in the respective first and second groups belong, wherein the access points transmit the distributed data to the first and second STAs via the first and second groups of the antennas in synchronization in accordance with the first and second distributed beamforming parameters.

8. The system according to claim 7, wherein the distributed beamforming parameters comprise a steering matrix to be applied to downlink signal vectors transmitted to the first and second STAs.

9. The system according to claim 7, wherein the at least one processor is disposed in at least one of the first and second APs.

10. The system according to claim 7, wherein the at least one processor is disposed in a hardware unit that is separate from the first and second APs.

11. The system according to claim 7, wherein the access points are configured to transmit the distributed data by transmitting signals simultaneously to both of the first and second STAs via the first and second groups of the antennas.

12. The system according to claim 7, wherein the APs are connected over a backbone network, and wherein the APs are synchronized by exchanging synchronization signals among the APs over the backbone network prior to transmitting the distributed data to the first and second STAs.

13. The system according to claim 12, wherein exchanging the synchronization signals comprises synchronizing respective clocks and frequency offsets of the second AP with the first AP prior to transmitting the distributed data to the first and second STAs.

14. The system according to claim 7, wherein the first STA and the second STA are configured to associate with the same BSS.

15. The system according to claim 7, wherein the plurality of APs comprises at least a first AP and a second AP, and wherein the first STA is configured to associate with a first BSS of a first AP the second STA associates with a second BSS, different from the first BSS, of the second AP.

* * * * *